2 United States Patent Office 3,552,912
Patented Jan. 5, 1971

3,552,912
METHOD OF REMOVING SULFUR DIOXIDE, NITROGEN DIOXIDE AND CARBON DIOXIDE FROM GASES
Roger F. Bartholomew, Corning, and Harmon M. Garfinkel, Horseheads, N.Y., assignors to Corning Glass Works, Corning, N.Y., a corporation of New York
No Drawing. Filed Nov. 14, 1969, Ser. No. 877,048
Int. Cl. C01b 53/00, 53/34
U.S. Cl. 23—2                                    3 Claims

ABSTRACT OF THE DISCLOSURE

Method of removing sulfur dioxide and/or nitrogen dioxide and/or carbon dioxide from gaseous mixtures comprising contacting said gaseous mixture first with a molten nitrate selected from the group consisting of sodium nitrate, silver nitrate and potassium nitrate and then with a molten hydroxide selected from the group consisting of sodium hydroxide and potassium hydroxide or with a molten mixture of at least one of said nitrates and hydroxides.

---

Although the hazards to health and injuries to aesthetics resulting from air pollution have long been recognized, it has only been in very recent years that efforts on anything other than a small scale have been undertaken. However, with growing local, state, and federal government concern with air pollution, industry is, and increasingly will be, seeking effective and economically practical methods for removing constituents from gaseous products which are expelled into the atmosphere.

Two toxic gases which are frequently produced as unwanted by products in the refining of metals or in the manufacture of glass or metal products and which can cause considerable irritation are sulfur dioxide ($SO_2$) and nitrogen dioxide ($NO_2$). Hence, for example, $SO_2$ is released in the roasting of copper sulfide ores and in the burning of sulfur-containing coals whereas $NO_2$ is expelled in glass manufacturing operations when nitrates are employed as batch materials.

This invention, then, has for its primary objective the treating of these gases in a manner to remove them from gaseous effluent being released into the atmosphere.

We have discovered that $SO_2$ can be removed from a stream of gas by passing it through a bath of molten nitrate selected from the group consisting of potassium nitrate ($KNO_3$), silver nitrate ($AgNO_3$), and sodium nitrate ($NaNO_3$) and $NO_2$ can be removed by passing the gas through a bath of a molten hydroxide selected from the group consisting of potassium hydroxide (KOH) and sodium hydroxide (NaOH). Therefore, to remove the two toxic gases in combination with each other, the effluent would be first bubbled through the bath of molten nitrate and then through the bath of molten hydroxide or through a single bath comprising a combination of said nitrate and hydroxide.

The reaction of $SO_2$ with the molten nitrate to yield a sulfate, as is recorded below, is very rapid:

$$SO_2(g) + 2MNO_3(l) \rightarrow M_2SO_4(s) + 2NO_2(g)$$

wherein M=K, Ag, and/or Na. The $M_2SO_4$ settles out of the molten salt and is compatible therewith.

The reaction of $NO_2$ with the molten hydroxide to yield a nitrite, as is recorded below, is likewise very rapid:

$$2NO_2(g) + 2MOH(l) \rightarrow MNO_2(l) + MNO_3(l) + H_2O(g)$$

where M=K and/or Na. The $MNO_2$ and $MNO_3$ are compatible with the bath.

Passing the gas through molten KOH and/or NaOH would have the secondary effect of removing any carbon dioxide ($CO_2$) therefrom:

$$2NaOH(l) + CO_2(g) \rightarrow H_2O(g) + Na_2CO_3(s)$$

which reaction is also very rapid.

In the following illustrative examples of this invention, reagent grade $NaNO_3$, $KNO_3$, $AgNO_3$, NaOH, and KOH were utilized which were air dried at 130° C. prior to being used. Anhydrous grade $SO_2$ and $NO_2$ were used which were likewise dried [by passing through a column of $Mg(ClO_4)_2$] prior to introduction into the reaction vessel. The pure hydroxide melts were fused in zirconium reaction vessels whereas alumina ($Al_2O_3$) reaction vessels were employed to hold the molten nitrates or the combination of nitrate and hydroxide.

The reactions were followed by examining the infrared spectra (gas cell) of the gaseous reaction products and the quenched melts (KBr technique) before, during, and after the reaction. Analyses of the solid spectra were achieved by comparison with a collection of control spectra of pure compounds.

To better monitor the reactions, inasmuch as the rates thereof are extremely rapid, an atmosphere of argon was maintained above the molten melt at all times, and the $SO_2$ and $NO_2$ swept into the reaction vessel with argon. The flow rates of the gases were held at about 500 cc./minute when measured at melt temperature. The reaction vessels were placed in a closed system so that the effluent gases could be collected in bulbs attached to a vacuum rack.

About 50 grams (0.6 mole) of $NaNO_3$ were melted and maintained at 355° C. $SO_2$ at a flow rate of about 120 cc./minute at the melt temperature and at a partial pressure of about one atmosphere was bubbled through the melt. Copious quantities of $NO_2$ gas were almost immediately recognized by the brown color thereof and confirmed in the infrared spectrum. The reaction was continued for two hours to check the stoichiometry thereof by allowing an excess of $SO_2$ to react completely with the $NaNO_3$. A comparison of the infrared spectrum of $Na_2SO_4$ with that of the solid reaction product indicated that $Na_2SO_4$ constituted the reaction product. Based upon the known amount of $NaNO_3$ starting material and the resulting weight change between the $NaNO_3$ and the $Na_2SO_4$ reaction product, it was calculated that one mole of $Na_2SO_4$ was formed from two moles of $NaNO_3$ in the melt.

About 50 grams (about 0.5 mole) of $KNO_3$ were melted and the temperature of the reaction vessel maintained at 500° C. Again, $SO_2$ at a flow rate of about 120 cc./minute and a partial pressure of about one atmosphere was passed into the melt for about two hours. Visual inspection and infrared analysis of the gas expelled from the melt almost immediately indicated $NO_2$. This reaction was likewise continued to check the stoichiometry thereof reacting completely the $KNO_3$ with an excess of $SO_2$. Infrared analysis of the reaction product demonstrated it to be $K_2SO_4$ and the resulting weight change led to the calculation that one mole of $K_2SO_4$ was formed from two moles of $KNO_3$ in the melt.

About 50 grams (about 0.9 mole) of KOH was melted and maintained at 440° C. $NO_2$ at a flow rate of 130 cc./minute at room temperature and a partial pressure of 0.94 atmosphere was bubbled into the melt. This rate is equivalent to about 0.008 mole of $NO_2$ entering the melt each minute. The effluent gas did not exhibit the brown coloration characteristic of $NO_2$. After the gas had been bubbled through the melt for approximately two hours, the effluent gas suddenly assumed a brown coloration. Infrared analysis indicated this brown gas to be $NO_2$.

A calculation based upon the quantity of $NO_2$ passed through the melt in the two-hour period, i.e., the amount of $NO_2$ required to react with 50 grams of KOH, determined that about 0.96 mole of $NO_2$ were needed to react completely with about 0.9 mole of KOH; hence, about a 1:1 molar ratio. The substances in the melt after completion of the reaction were identified by infrared analysis to be nitrate and nitrite. An aqueous solution of the melt measured a pH of about 7.

About 50 grams (about 1.25 moles) of NaOH were melted at 355° C. and held thereat for about 2¾ hours while $NO_2$ at a flow rate of 130 cc./minute at room temperature and a partial pressure of about one atmosphere was passed into the melt. After that period of reaction the effluent gas exhibited a brown coloration which infrared analysis indicated to be $NO_2$. A calculation similar to that described above with regard to the reaction of $NO_2$ and KOH also determined an approximate 1:1 molar reaction ratio of NaOH and $NO_2$. Infrared analysis of the solid reaction product reported the presence of nitrate and nitrite.

Having discovered that $SO_2$ can be removed from a gas by bubbling through a bath of molten nitrate and $NO_2$ can be removed from a gas by bubbling through a bath of molten hydroxide, an equimolar melt of $NaNO_3$ and NaOH (42.5 grams $NaNO_3$+20 grams NaOH) was melted at 400° C. and $SO_2$ at a flow rate of 120 cc. per minute and a partial pressure of about one atmosphere passed into the melt. After ¾ hour at 400° C., the melt had built up sufficient sulfate to cause the mixture to freeze and a slight brown coloration was seen in the effluent gas. Infrared analysis of this effluent gas indicated the presence of $NO_2$ and $SO_2$.

Assuming that the overall reaction taking place is contemplated in the following equation:

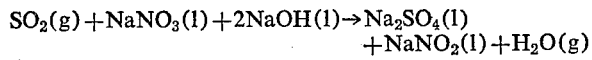

it was apparent that the stoichiometry thereof requires a ratio of two moles hydroxide to one mole of nitrate. Therefore, an excess of nitrate, as would be present in the equimolar melt, led to the production of more $NO_2$ than could be removed by the hydroxide.

Thereupon, a 66 mole percent KOH-33 mole percent $KNO_3$ mixture (28 grams KOH+25 grams $KNO_3$) was melted and maintained at 500° C. $SO_2$ at a flow rate of about 120 cc./minute and a partial pressure of about one atmosphere bubbled through the melt. Infrared spectra observed soon after the beginning of the reaction indicated essentially no $SO_2$ or $NO_2$ present therein. However, after about an hour of reaction time infrared analyses of the effluent gas reported the substantial pressure of $SO_2$ with some $NO_2$. A considerable amount of solid material, analyzed as $K_2SO_4$ and $NaNO_2$, was deposited in the reaction vessel.

Therefore, from these examples, it is believed apparent that this invention provides effective means for removing $SO_2$ and $NO_2$ from flue gases and other sources of air pollution. Hence, where $NO_2$ alone is present, its elimination can be secured through reaction with molten NaOH and/or KOH. Where $SO_2$ is present alone or in combination with $NO_2$, reaction thereof with successive sources of molten $NaNO_3$, $KNO_3$, and/or $AgNO_3$ and NaOH and/or KOH will accomplish its removal or a single source comprising a combination of nitrate and hydroxide will likewise be effective. In large scale removal of these toxic gases, the use of a series of baths (the so-called cascade-type process) might be better employed such that cleaning of the gas could continue while a spent bath was being rechanged.

For fuel economies and to avoid thermal decomposition of the melts, the bath temperatures should preferably range between about 325°–525° C.; it being appreciated that the speed of reaction varies exponentially with temperature. Inasmuch as the rates of reaction are very rapid, the flow of gas into the bath must be fast enough to prevent the buildup of solid reaction products across the entry duct thereby stopping the flow of gas therethrough. The maximum flow rate is dependent upon such factors as excessive turbulence caused in the melt, the carryover of solid reaction product into the exit duct due to the excessive turbulence, incomplete reaction of the gas with the melt, etc. Nevertheless, the proper rate of gas flow can be readily determined empirically and is believed to be well within the technical competence of one of the ordinary skill in the art.

Finally, it can be appreciated that this invention can also remove carbon dioxide ($CO_2$) from a gaseous environment according to the following reaction:

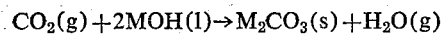

wherein M=K and/or Na. Therefore, whereas $CO_2$ is not generally classified as having the toxicity of $SO_2$ or $NO_2$, it does possess harmful characteristics and this invention does have the capability of removing it from the atmosphere.

To illustrate this reaction, which is also very rapid, 50 grams (about 0.9 mole) of KOH were melted and maintained at 440° C. $CO_2$ at a flow rate of about 130 cc./minute at room temperature and a partial pressure of 0.94 atmosphere was passed into the melt. Employing infrared analyses to monitor the reaction, it was observed that essentially no $CO_2$ was present in the effluent gas until about 1 hour after the reaction had begun with water vapor constituting the released gas. Analysis of the reaction product indicated the substantial conversion of KOH to $K_2CO_3$.

A check of the stoichiometry of the reaction utilizing the resultant weight change determined that one mole of $K_2CO_3$ was formed from two miles of KOH.

We claim:
1. A method for removing sulfur dioxide and/or nitrogen dioxide and/or carbon dioxide from a gaseous environment which comprises passing said gaseous environment through
   (1) a bath of a molten nitrate selected from the group consisting of $NaNO_3$, $AgNO_3$, and $KNO_3$ and then through a bath of a molten hydroxide selected from the group consisting of NaOH and KOH; or
   (2) a bath composed of a combination of at least one molten nitrate selected from the group consisting of $NaNO_3$, $AgNO_3$, and $KNO_3$ and at least one molten hydroxide selected from the group consisting of NaOH and KOH.

2. A method according to claim 1 wherein said baths are maintained at a temperature between about 325°–525° C.

3. A method according to claim 1 wherein said combination bath consists of about 66 mole percent hydroxide and 33 mole percent nitrate.

References Cited

UNITED STATES PATENTS

| | | | |
|---|---|---|---|
| 2,007,478 | 7/1935 | Rosenstein | 23—102 |
| 3,438,722 | 4/1969 | Heredy et al. | 23—2 |

OTHER REFERENCES

A.P.C. application of Beck et al. Ser. No. 292, 742, published July 13, 1943 (abandoned).

A.P.C. application of Beck et al., Ser. No. 393,258, pulished July 13, 1943 (abandoned).

EARL C. THOMAS, Primary Examiner

U.S. Cl. X.R.

23—150,161, 178